United States Patent [19]
Kim

[11] Patent Number: 6,085,326
[45] Date of Patent: Jul. 4, 2000

[54] APPARATUS AND METHOD FOR DISPLAYING DPMS MODE STATUS USING AN OSD CIRCUIT

[75] Inventor: Young-Chan Kim, Kyungki-do, Rep. of Korea

[73] Assignee: SamSung Electronics Co., Ltd., Suwon, Rep. of Korea

[21] Appl. No.: 09/024,119

[22] Filed: Feb. 17, 1998

[30] Foreign Application Priority Data

Feb. 24, 1997 [KR] Rep. of Korea ......................... 97-5492

[51] Int. Cl.[7] ...................................................... G06F 1/32
[52] U.S. Cl. ........................................... 713/300; 345/211
[58] Field of Search .................................. 713/300–340; 345/211, 212, 213

[56] References Cited

U.S. PATENT DOCUMENTS

| 5,389,952 | 2/1995 | Kikinis . | |
|---|---|---|---|
| 5,396,635 | 3/1995 | Fung . | |
| 5,428,790 | 6/1995 | Harper et al. . | |
| 5,555,032 | 9/1996 | Kung . | |
| 5,586,333 | 12/1996 | Choi et al. . | |
| 5,696,978 | 12/1997 | Nishikawa | 713/324 |
| 5,736,873 | 4/1998 | Hwang | 327/41 |
| 5,758,172 | 5/1998 | Seo | 713/300 |
| 5,805,151 | 9/1998 | Hwang | 345/213 |
| 5,812,821 | 9/1998 | Sugi et al. | 395/500.46 |
| 5,880,677 | 3/1999 | Lestician | 340/823.06 |

*Primary Examiner*—Ayaz R. Sheikh
*Assistant Examiner*—David A. Wiley
*Attorney, Agent, or Firm*—Robert E. Bushnell, Esq.

[57] ABSTRACT

A method of displaying a display power management signaling (DPMS) using an on screen display (OSD) in a display device includes the steps of: determining whether a sync signal is input or not; storing a DPMS state corresponding to the sync signal which is input; and driving an output port of a microcomputer to display the stored DPMS state through the OSD during a predetermined time.

14 Claims, 6 Drawing Sheets

APPARATUS AND METHOD FOR DISPLAYING DPMS MODE STATUS USING AN OSD CIRCUIT

CLAIM OF PRIORITY

This application makes reference to, incorporates the same herein, and claims all benefits accruing under 35 U.S.C §119 from an application entitled Display Power Management Signaling Display Method Using On Screen Display In Display Device earlier filed in the Korean Industrial Property Office on Feb. 24, 1997, and there duly assigned Ser. No. 97-5492 by that Office.

BACKGROUND OF THE INVENTION

1. Field of the Invention

The present invention relates to an apparatus and method of displaying a display power management signaling (DPMS) state using an on-screen display (OSD) integrated circuit (IC) in a display device. Specifically, this invention is a DPMS state display apparatus and method for displaying the present state of DPMS using an OSD IC when a signal is abnormally input to a display device, or a signal cable is detached.

2. Discussion of Related Art

Generally, a display device comprises control means for reducing power consumption. In one approach, the control means may be implemented by a DPMS, proposed by Video Electronics Standard Association (VESA) in U.S.A. The DPMS functions to manage power of a display device, which is one of the peripheral devices of a computer, according to a used state of the computer to save the power. It is well known that the DPMS power supply modes may be classified into a normal mode, a standby mode, a suspend mode and a power-off mode. Power management in a computer is described in, for example: U.S. Pat. No. 5,586,333 to Chun-Geun Choi, et al., entitled, Method And Control Apparatus For General Power Management Signal Of Computer Peripheral Equipment IN A Computer System; U.S. Pat. No. 5,555,032 to Yung-Keng Kung entitled Integrated Circuit For Economizing Power Consumption Of A Monitor By Using Two Reference Values For Discriminating The Input Signal; U.S. Pat. No. 5,428,790 to Leroy D. Harper, et al., entitled, Computer Power Management System; U.S. Pat. No. 5,396,635 to Henry T. Fung, entitled, Power Conservation Apparatus Having Multiple Power Reduction Levels Dependent Upon The Activity Of the Computer System; and U.S. Pat. No. 5,389,952 to Dan Kikinis entitled Low-Power-Consumption Monitor Standby System.

In conformity with VESA, the computer selectively supplies or blocks horizontal and vertical synchronous signals to the display device according to the computer's state, and the display device manages power according to the presence of the horizontal and vertical synchronous signals from the computer.

The power management states are classified into an on state, a stand-by state, a suspend state and a power off state. Both the horizontal and vertical synchronous signals are applied in the on state, and only the vertical synchronous signal is applied in the stand-by state. Only the horizontal synchronous signal is applied in the suspend state, and neither the horizontal nor vertical synchronous, signal are applied in the power off state. The DPMS state converts from an on mode to a stand-by mode, a suspend mode, and an off mode in sequence, according to a time lapse corresponding to the lack of use of the computer system. I have determined that the user should be notified of the current DPMS state. I have considered that the use of color light emitting diodes (LEDs) installed on a display device, or blinking LEDs would result in a problem that a user must be well acquainted with LED states through a guide program provided by a display device provider in order to recognize the displayed DPMS state.

Additionally, I have determined that when a signal cable for transmitting a signal output by a main body is not connected, the DPMS state must be converted to an off mode to minimize power consumption. However, the power necessary for a normal operation must be applied to a display device in order to display a message for warning or informing a user of the present state by driving an OSD. There would then be a problem that power is consumed while the OSD is being driven.

SUMMARY OF THE INVENTION

Accordingly, the present invention is directed to a DPMS display apparatus and method using an OSD IC in a display device that substantially obviates one or more of the limitations and disadvantages described above.

An object of the present invention is to provide a method for informing a user of a DPMS state of a display device in such a manner that, after starting a DPMS mode when an abnormal signal is input from a main body to a display device in a personal computer system, the DPMS mode is cancelled during a predetermined time when a predetermined user key on the display device is selected, and a DPMS state is displayed through an OSD.

To achieve these and other objects, and in accordance with the purpose of the present invention as embodied and broadly described, an apparatus and method of displaying a display power management signaling (DPMS) state using an on screen display integrated circuit (OSD IC) in a display device comprises steps of: determining whether a synchronizing (sync) signal is input or not; storing a current DPMS state corresponding to the sync signal which is input into an internal memory of a microcomputer; and driving an output port of the microcomputer to display the stored DPMS state through the OSD IC during a predetermined time when a predetermined user key on the display device is selected by the user.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Reference will now be made in detail to the preferred embodiments of the present invention, examples of which are illustrated in the accompanying drawings.

Figure 1:
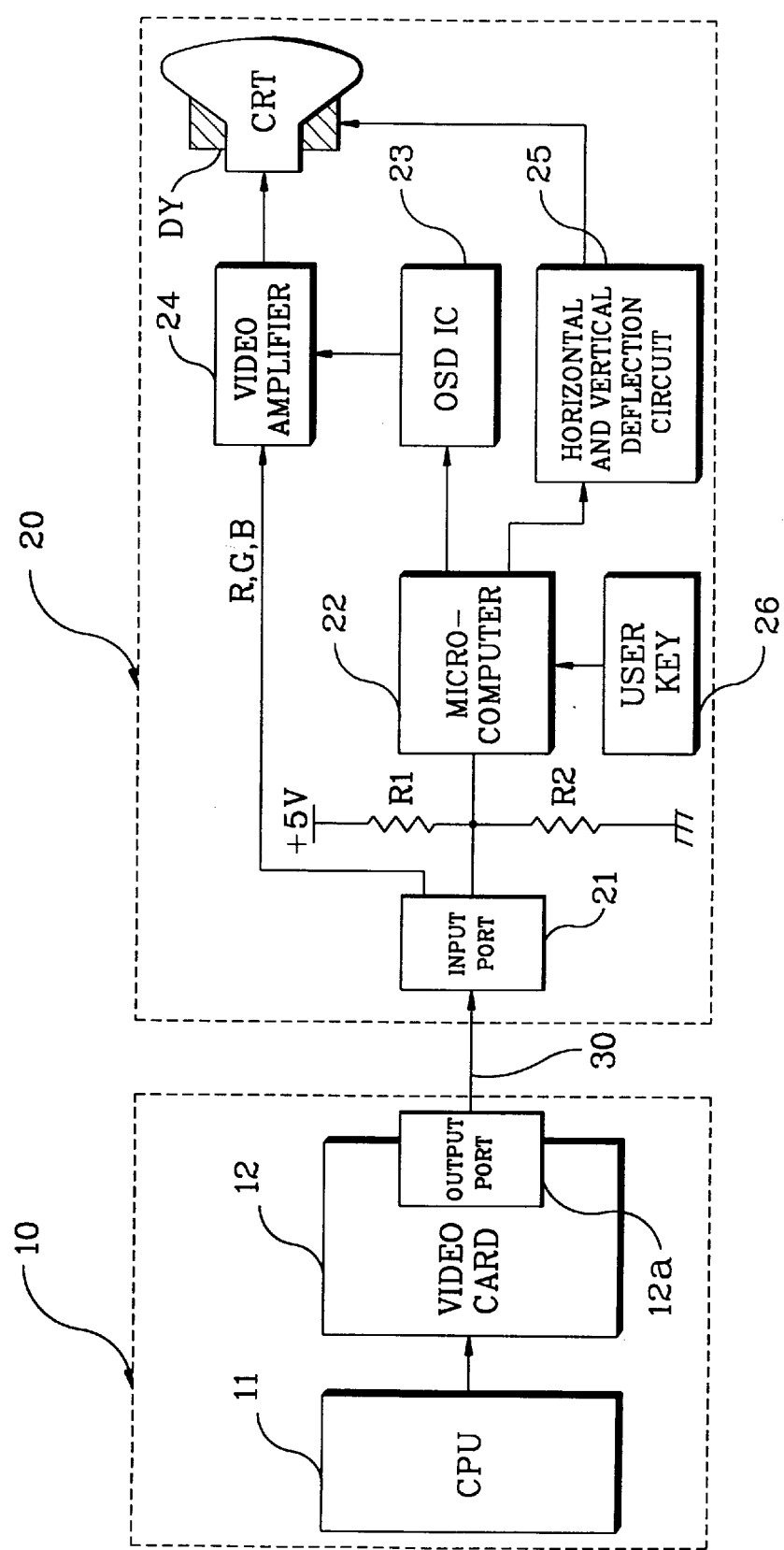
FIG. 1 is a block diagram of a personal computer system according to the present invention.

Referring to FIG. 1, data processed by CPU 11 of a computer 10 is converted to a RGB video signal by video card 12. Video card 12 generates a horizontal sync signal and a vertical sync signal to synchronize the video signal. The video signal, horizontal sync signal, and vertical sync signal generated by video card 12 are transmitted to D-SUB input port 21 of display device 20 through output port 12a via signal cable 30. The RGB video signal transmitted to D-SUB input port 21 is output to video pre-amplifier 24 for amplification and the amplified video signal is then applied to a CRT to be displayed.

The amplified RGB video signal applied to the CRT is synchronized by horizontal and vertical saw tooth wave current generated in a horizontal deflection yoke and a vertical deflection yoke. The horizontal and vertical deflection yokes, which generate the horizontal and vertical saw tooth wave current, are controlled by horizontal and vertical deflection circuit 25, which receives horizontal and vertical sync signals output by microcomputer 22 in response to the horizontal and vertical sync signals output from input port 21 and having a level determined by a dividing circuit comprising resistors R1 and R2.

Figure 2:
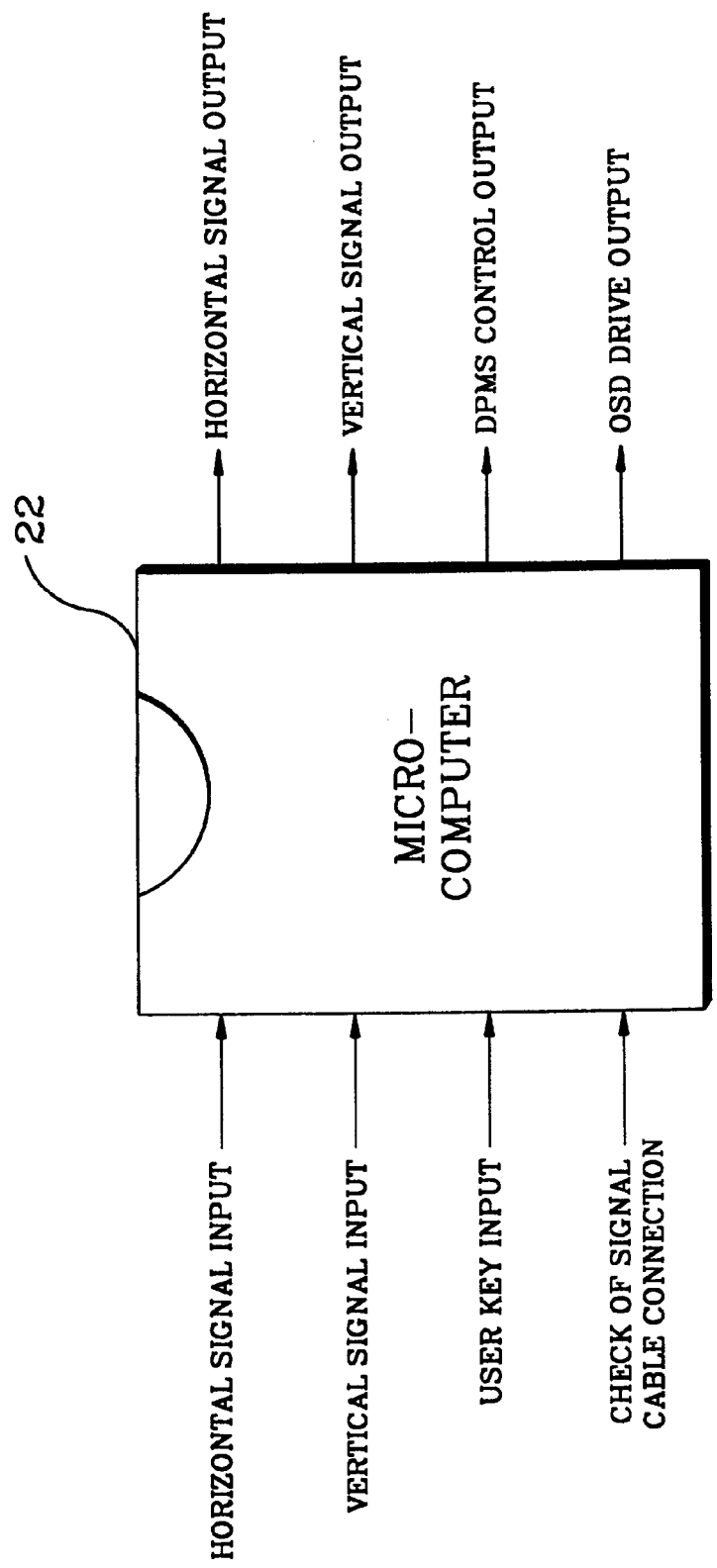
FIG. 2 illustrates inputs and outputs of the microcomputer shown in FIG. 1.

Microcomputer 22 stores information regarding a current state of display device 20. More specifically, microcomputer 22 stores the current DPMS state in response to the detection of the horizontal and vertical sync signals received via the dividing circuit from input port 21. As shown in FIG. 2 microcomputer 22 generates an OSD drive signal to control an OSD IC 23 to display the current DPMS state in response to activation of a user key 26, as will be described with respect to FIGS. 3 and 4.

Figure 3:
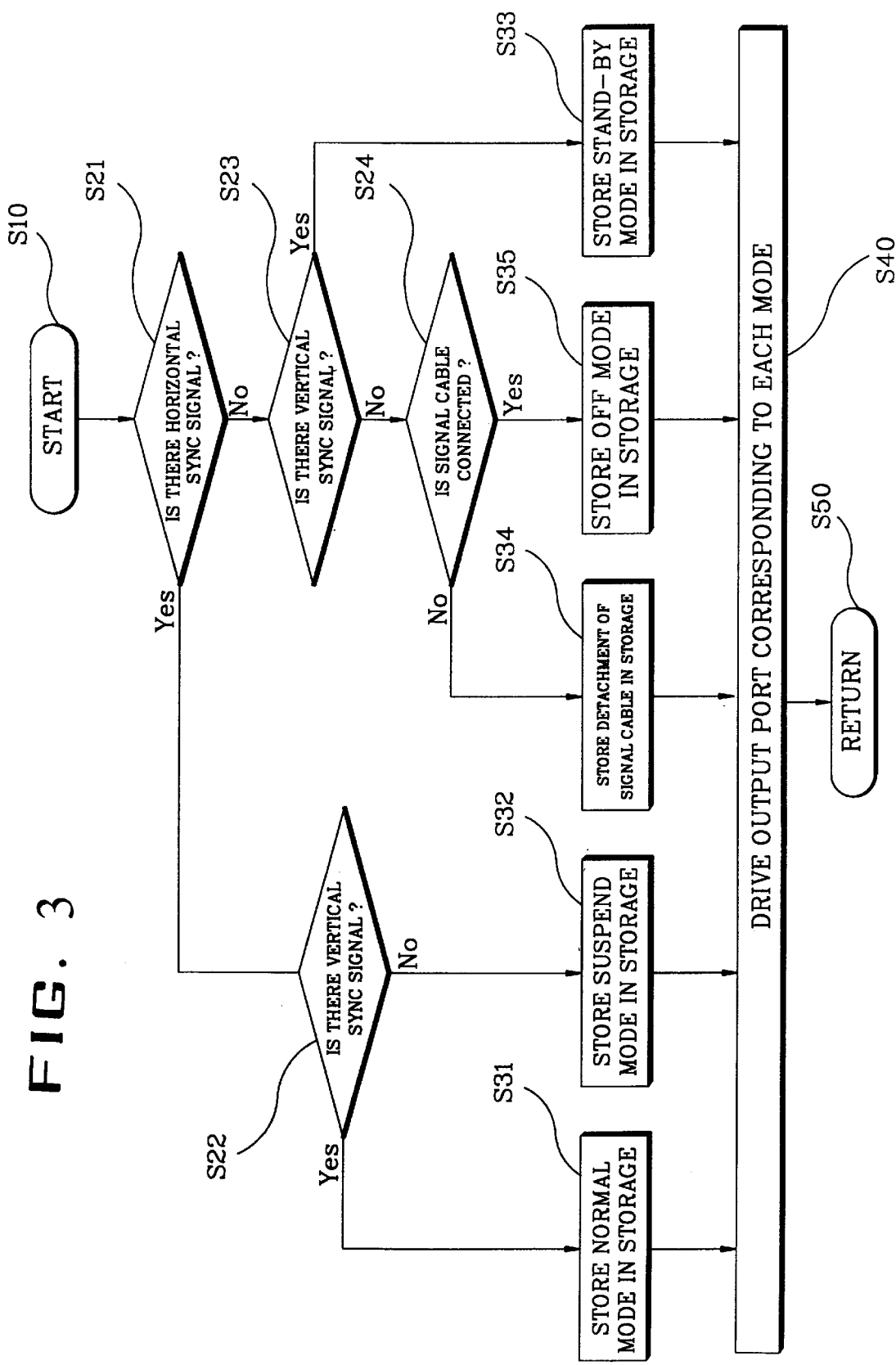
FIG. 3 is a flow chart of a DPMS display method using an OSD according to the present invention.

As illustrated in FIG. 3, the horizontal and vertical sync signals are input to microcomputer 22 at step S10. When the horizontal and vertical sync signals are input to microcomputer 22 through D-SUB input port 21, microcomputer 22 determines whether the sync signals are normally input (steps S21, S22, S23, S24). As a result of this determination, the DPMS state is stored in a storage of a memory internally installed in microcomputer 22 (steps S31, S32, S33, S34, S35). Specifically, microcomputer 22 determines whether a horizontal sync signal generated by video card 12 in computer 10 of a personal computer is input in step S21. If the horizontal sync signal is determined to have been input, microcomputer 22 determines whether a vertical sync signal is input in step S22. If both the horizontal and vertical sync signals are determined to have been input in steps S21 and S22, a current DPMS state indicative of a normal DPMS mode of operation is stored in the memory of microcomputer 22 in step S31. If it is determined in step S22 that the vertical sync signal is not input, a current DPMS state indicative of a suspend DPMS mode is stored in the memory of microcomputer 22 in step S32.

If it is determined in step S21 that the horizontal sync signal is not input, microcomputer checks for input of the vertical sync signal in step S23, and, if it is determined in step S23 that the vertical sync signal is input, a current DPMS state indicative of a stand-by DPMS mode is stored in the memory of microcomputer 22 in step S33.

If it is determined in step S23 that the vertical sync signal is not input, microcomputer 22 checks whether signal cable 30 is connected in step S24. If it is determined that signal cable 30 is connected in step S24, a current DPMS state indicative an off DPMS mode is stored in the memory of microcomputer 22 in step S35. If it is determined that signal cable 30 is not connected in step S24, a current DPMS state indicating that signal cable 30 is detached is stored in the memory of microcomputer 22 in step S34.

After storing a current DPMS state in memory of microcomputer 22, it may be desired to generate an OSD drive signal to control OSD IC 23 for displaying the current DPMS state on the CRT in step S40, as will be explained with respect to FIG. 4.

Figure 4:
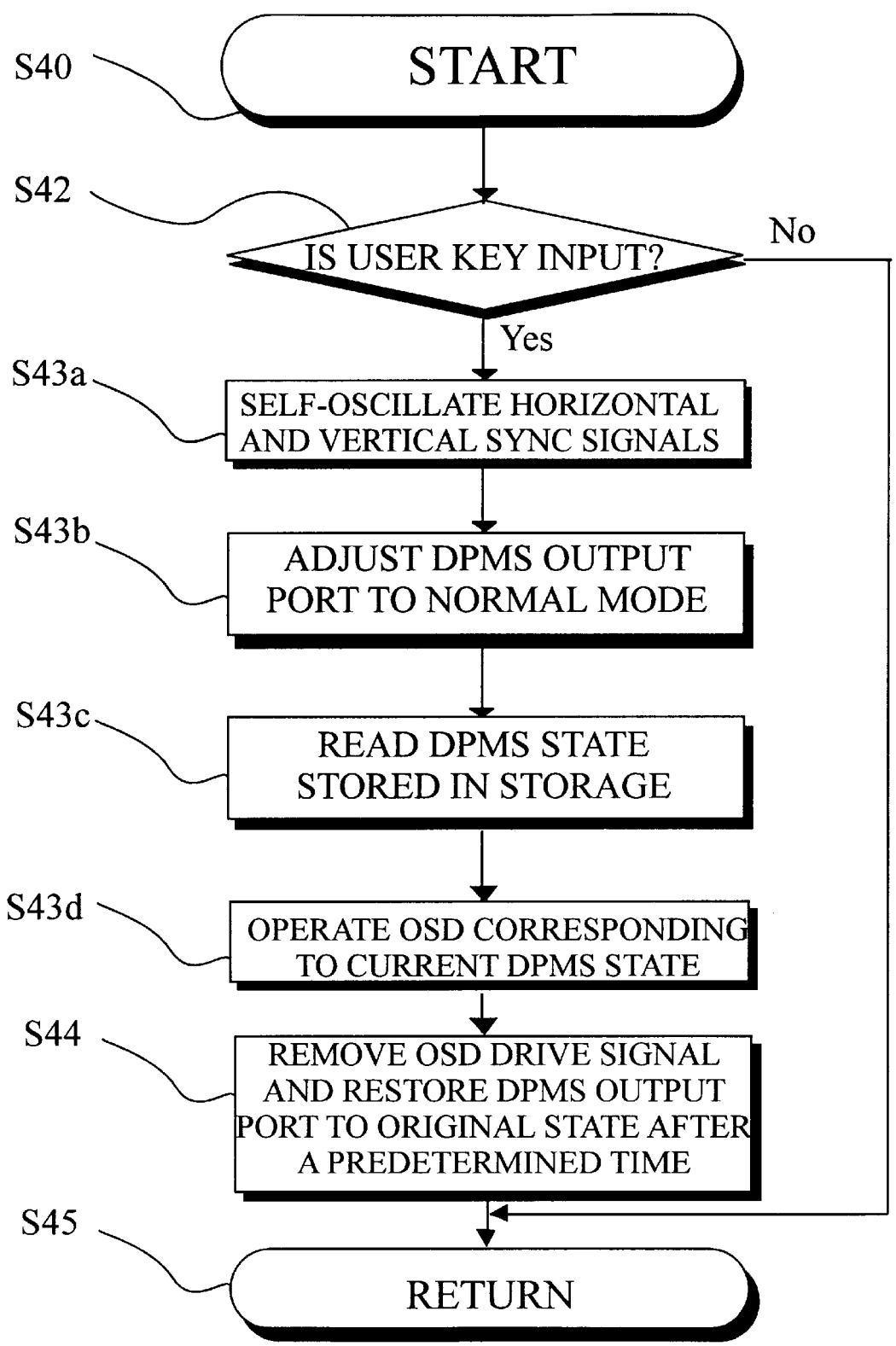
FIG. 4 is a flow chart showing how a DPMS state is displayed using an OSD according to the present invention.

More specifically, as shown in FIG. 4, the process for displaying the current DPMS mode starts at step S41 and microcomputer 22 checks for activation of user key 26 in step S42. If it is determined that user key 26 has not been activated the process returns to the start to again check, in step S42, for user activation of user key 26. If it is determined in step S42 that user key 26 has been activated, microcomputer 22 performs self-oscillation operation using an internal self-oscillation circuit (not shown) to generate horizontal and vertical sync signals in step S43a. A DPMS control signal output port in microcomputer 22 is adjusted to control display device 20 to operate in the normal mode in step S43b. After adjusting the DPMS control signal output port to the normal mode in step S43b, microcomputer 22 reads the stored current DPMS state in step S43c, and then transmits an OSD drive signal corresponding to the current DPMS state to OSD IC 23 through an OSD drive output port to drive OSD IC 23 in step S43d. When OSD IC 23 is driven by the OSD drive signal, a corresponding OSD video signal output by OSD IC 23 is applied to video pre-amplifier 24. After being amplified by video pre-amplifier 24, the current DPMS mode is displayed on the screen of the CRT according to the OSD video signal. At this time, horizontal and vertical deflection circuit 25 receives the horizontal sync signal and a vertical sync signal which are self-oscillated by microcomputer 22 and the OSD video signal is synchronized by horizontal and vertical saw tooth wave currents which are generated in horizontal and vertical deflection yokes (DY) in response to the self-oscillated horizontal and vertical sync signals. After a predetermined time, in step 44, the OSD drive signal is removed from the OSD drive output port and the DPMS output port is returned to the state it was in, i.e., the displayed DPMS mode, prior to step S43b. The process then returns (step S45) to the start to again check, in step S42, for user activation of user key 26.

Figure 5:
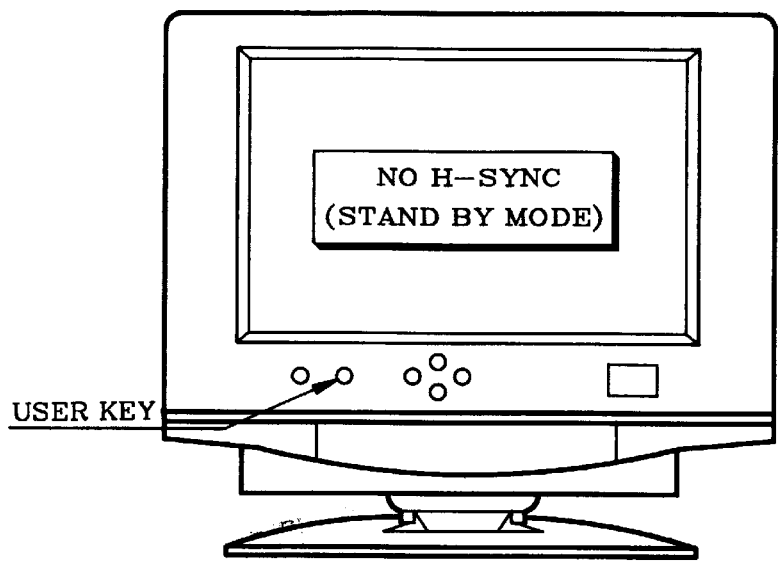
FIG. 5 shows a display device displaying a DPMS stand-by state according to the principles of the present invention.
Figure 6:
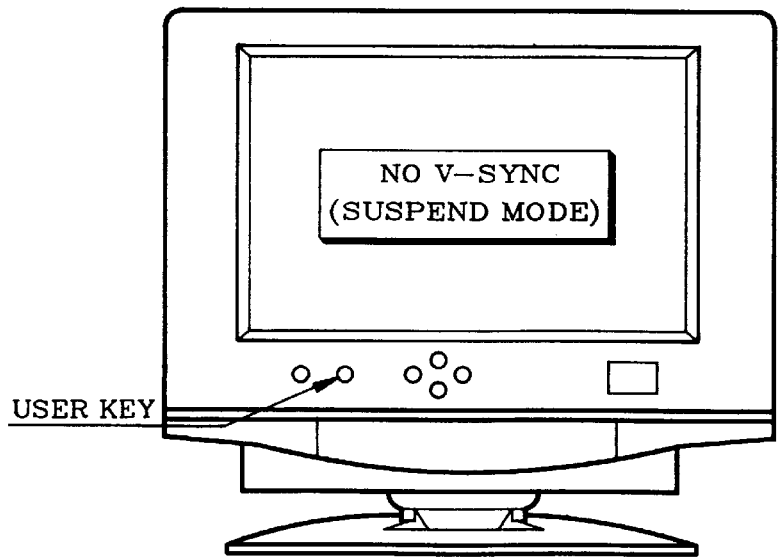
FIG. 6 shows a display device displaying a DPMS suspend state according to the principles of the present invention.
Figure 7:
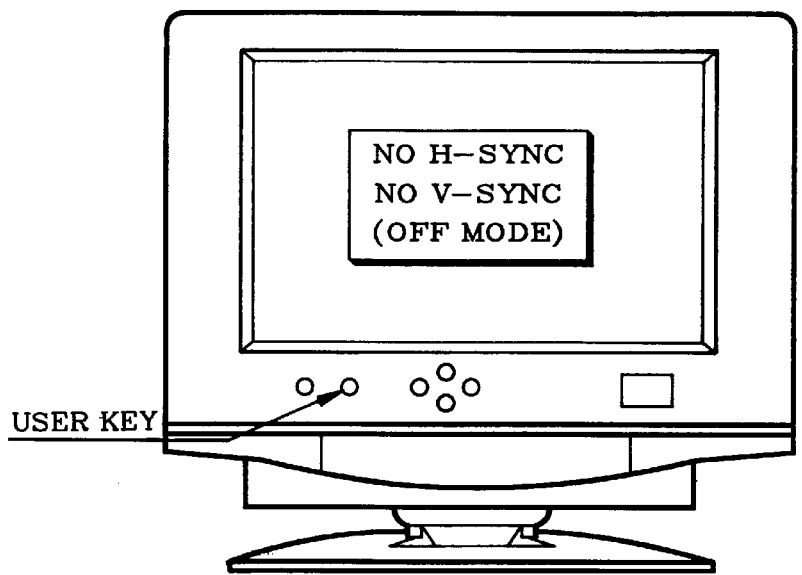
FIG. 7 shows a display device displaying a DPMS off state according to the principles of the present invention.
Figure 8:
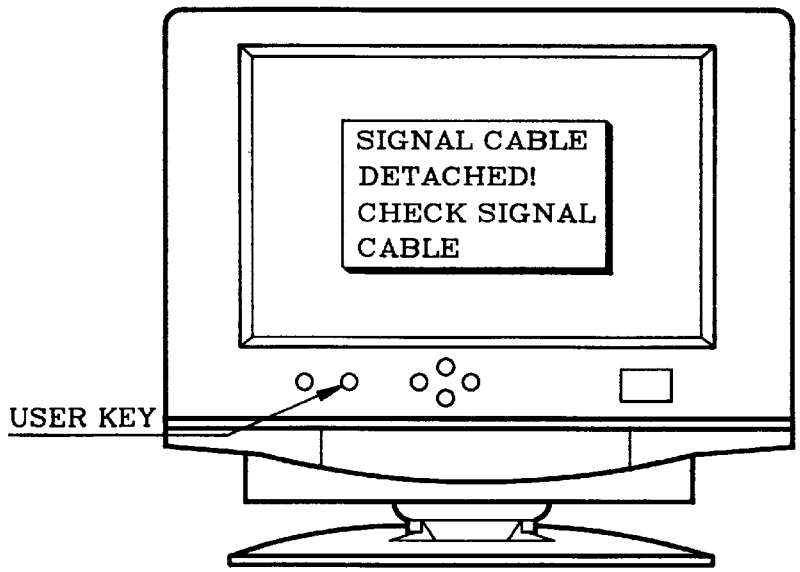
FIG. 8 shows a display device displaying the detachment of a signal cable according to the principles of the present invention.

Through the above operations, the stand-by DPMS mode is displayed on display device 20 as shown in FIG. 5 when there is a vertical sync signal but no horizontal sync signal input from computer 10. As shown in FIG. 6, the suspend DPMS mode is displayed when there is a horizontal sync signal but no vertical sync signal input from computer 10. As shown in FIG. 7, when there is neither a horizontal sync signal nor a vertical sync signal input from computer 10, the off DPMS mode is displayed. As shown in FIG. 8, when signal cable 30 is detached, a message indicating the detachment of the signal cable is displayed.

After displaying the current DPMS mode during a predetermined time, microcomputer 22 removes the OSD drive signal and keeps the DPMS mode currently stored in memory. For example, when a current mode is a stand-by mode, after the stand-by mode is displayed through OSD IC 23 during the predetermined time to inform a user of the current mode and after the OSD drive signal is removed, display device 20 is converted from the normal mode, as set in step S43b, to the stand-by mode. Simultaneously, the process returns to start to then perform step steps S42 through S45.

Step S40 in FIGS. 3 and 4 is an interrupt step caused by the activation of user key 26. If the user key is not input, return step S50 in FIG. 3 returns the process of microcomputer 22 to step S10 to again check for inputs of the horizontal and vertical sync signals.

As illustrated, the present invention displays the present DPMS state of a display device using an OSD function, depending upon the selection of a user key after minimizing consumption power by operating the display device in the DPMS state when an abnormal signal is applied to the display device, or a signal cable is detached, thereby allowing a user to easily recognize the present DPMS state.

It will be apparent to those skilled in the art that various modifications and variations can be made in DPMS display method using an OSD in a display device of the present invention without deviating from the spirit or scope of the invention. Thus, it is intended that the present invention cover the modifications and variations of this invention provided they come within the scope of the appended claims and their equivalents.

What is claimed is:

1. A method of displaying a display power management signaling (DPMS) using an on screen display integrated circuit (OSD IC) in a display device comprising the steps of:
    determining whether a sync signal is input or not;
    storing, in a memory of a microcomputer, a current DPMS state corresponding to the sync signal which is input; and
    driving said OSD IC in response to an OSD drive signal output from an OSD drive output port of said microcomputer to display a message on a screen of said display device during a predetermined time after a user key on said display device is activated, said message being indicative of the stored current DPMS state; said driving step comprising:
        detecting an input from said user key;
        adjusting a DPMS output port of said microcomputer to a normal mode, when the input of said user key is detected, for enabling the message indicative of the current DPMS mode to be displayed during the predetermined time; and
        restoring the DPMS output port to the stored DPMS state after the predetermined time period has elapsed.

2. The method according to claim 1, wherein the determining step comprises the steps of:
    determining whether a horizontal sync signal is input;
    determining whether a vertical sync signal is input when the horizontal sync signal is input;
    determining whether a vertical sync signal is input when the horizontal sync signal is not input; and
    determining whether a signal cable is detached when neither the horizontal sync signal nor the vertical sync signal are input.

3. The method according to claim 1, wherein the storing step comprises the steps of:
    storing a DPMS state indicative of a normal DPMS mode when both the horizontal sync signal and the vertical sync signal are input;
    storing a DPMS state indicative of a suspend DPMS mode when only the horizontal sync signal is input;
    storing a DPMS state indicative of a stand-by DPMS mode when only the vertical sync signal is input;
    storing a DPMS state indicative of an off DPMS mode when a signal cable is connected and neither the horizontal sync signal nor the vertical sync signal are input; and
    storing a DPMS state indicative of a detachment state of the signal cable when the signal cable is not connected.

4. The method according to claim 1, wherein the driving step further comprises the steps of:
    performing a self-oscillation to generate an internal horizontal sync signal and an internal vertical sync signal, when the input of said user key is detected;
    reading the stored current DPMS state from said memory of said microcomputer, after adjusting said DPMS output port to the normal DPMS mode;
    generating said OSD drive signal for operating said OSD IC to output an OSD video signal comprising said message; and
    removing said OSD drive signal from said OSD drive output port after said predetermined time has elapsed.

5. An apparatus for displaying a current display power management signaling (DPMS) mode on a screen of a cathode ray tube (CRT) a display device attached to a computer, said apparatus comprising:
    an input port for receiving a video signal, a horizontal sync signal and a vertical sync signal output via a signal cable connecting an output port of a video card of said computer to said input port;
    a video amplifier for generating an amplified video signal and for applying the amplified video signal to said CRT, said video amplifier being connected to said input port for receiving said video signal;
    a microcomputer, connected to said input means, for generating horizontal and vertical synchronizing signals in response to said horizontal and vertical sync signals received by said input port;
    a user key on said display device for inputting a key signal in response to user activation for controlling said microcomputer;
    an on-screen display (OSD) integrated circuit (IC) for generating an OSD video signal for input to said video amplifier upon user activation of said user key, said OSD video signal comprising a message indicative of a current DPMS mode; and
    a horizontal and vertical deflection circuit responsive to the horizontal and vertical synchronizing signals output from said microcomputer for providing horizontal and vertical signals to said CRT;
    said microcomputer determining whether said horizontal and vertical sync signals are received by said input port and storing, in an internal memory, a current DPMS state corresponding to the resulting determination;

said microcomputer detecting user activation of said user key and outputting an OSD drive signal for driving said OSD IC to generate said OSD video signal to display said message on said screen of said CRT during a predetermined time after said user key is activated, said message being indicative of the stored current DPMS state.

6. The apparatus as set forth in claim 5, said microcomputer generating internally oscillated horizontal and vertical synchronizing signals in response to the activation of said user key, when said input port does not receive the horizontal sync signal or the vertical sync signal from said output port.

7. The apparatus as set forth in claim 5, said microcomputer determining whether said horizontal sync signal is received by said input port, whether said vertical sync signal is received by said input port when it is determined that the horizontal sync signal is received by said input port, whether said vertical sync signal is received by said input port when it is determined that the horizontal sync signal is not received by said input port, and determining whether said signal cable is connected to said input port when it is determined that neither the horizontal sync signal nor the vertical sync signal are received by said input port.

8. The apparatus as set forth in claim 5, said microcomputer storing a DPMS state indicative of a normal DPMS mode when both the horizontal sync signal and the vertical sync signal are received by said input means, storing a DPMS state indicative of a suspend DPMS mode when only the horizontal sync signal is received by said input means, storing a DPMS state indicative of a stand-by DPMS mode when only the vertical sync signal is received by said input means, storing a DPMS state indicative of an off DPMS mode when said signal cable is connected and neither the horizontal sync signal nor the vertical sync signal are received by said input means, and storing a DPMS state indicative of a detachment state of said signal cable when the signal cable is not connected.

9. The apparatus as set forth in claim 7, said microcomputer storing a DPMS state indicative of a normal DPMS mode when it is determined that both the horizontal sync signal and the vertical sync signal are received by said input means, storing a DPMS state indicative of a suspend DPMS mode when it is determined that only the horizontal sync signal is received by said input means, storing a DPMS state indicative of a stand-by DPMS mode when it is determined that only the vertical sync signal is received by said input means, storing a DPMS state indicative of an off DPMS mode when it is determined that said signal cable is connected and neither the horizontal sync signal nor the vertical sync signal are received by said input means, and storing a DPMS state indicative of a detachment state of said signal cable when it is determined that the signal cable is not connected.

10. The apparatus as set forth in claim 5, said microcomputer comprising a DPMS output port, said DPMS output port normally having a state corresponding to the currently stored DPMS state, said DPMS output port being adjusted to a DPMS state indicative of a normal DPMS mode when said user key is activated, for enabling the message indicative of the current DPMS mode to be displayed during said predetermined time, said DPMS output port being restored to the stored DPMS state after said predetermined time has elapsed.

11. The apparatus as set forth in claim 6, said microcomputer comprising a DPMS output port, said DPMS output port normally having a state corresponding to the currently stored DPMS state, said DPMS output port being adjusted to a DPMS state indicative of a normal DPMS mode when said user key is activated, for enabling the message indicative of the current DPMS mode to be displayed during said predetermined time, said DPMS output port being restored to the stored DPMS state after said predetermined time has elapsed.

12. A method of displaying a display power management signaling (DPMS) state using an on screen display integrated circuit (OSD IC) in a display device comprising the steps of:

determining whether a horizontal sync signal is input to an input port, said input port receiving a video signal, a horizontal sync signal and a vertical sync signal output via a signal cable connecting an output port of a video card of a host computer to said input port;

determining whether a vertical sync signal is input to said input port when it is determined that the horizontal sync signal is input;

determining whether a vertical sync signal is input to said input port when it is determined that the horizontal sync signal is not input; and determining whether said signal cable is connected to said input port when it is determined that neither the horizontal sync signal nor the vertical sync signal are input;

storing, in a memory of a microcomputer, a DPMS state indicative of a normal DPMS mode when it is determined that both the horizontal sync signal and the vertical sync signal are input;

storing, in said memory of said microcomputer, a DPMS state indicative of a suspend DPMS mode when it is determined that only the horizontal sync signal is input;

storing, in said memory of said microcomputer, a DPMS state indicative of a stand-by DPMS mode when it is determined that only the vertical sync signal is input;

storing, in said memory of said microcomputer, a DPMS state indicative of an off DPMS mode when it is determined that said signal cable is connected and neither the horizontal sync signal nor the vertical sync signal are input; and storing, in said memory of said microcomputer, a DPMS state indicative of a detachment state of said signal cable when the signal cable is not connected; and driving said OSD IC in response to an OSD drive signal output from an OSD drive output port of said microcomputer to display a message on a screen of said display device during a predetermined time after a user key on said display device is activated, said message being indicative of the stored DPMS state.

13. The method as set forth in claim 12, wherein the driving step comprises the steps of:

detecting an input from said user key;

adjusting a DPMS output port of said microcomputer to the normal DPMS mode, when the input of said user key is detected, for enabling the message indicative of the stored DPMS state to be displayed during said predetermined time; and restoring said DPMS output port to the stored DPMS state after said predetermined time has elapsed.

14. The method according to claim 13, wherein the driving step further comprises the steps of:

performing, by said microcomputer, a self-oscillation to generate an internal horizontal sync signal and an internal vertical sync signal, when the input of said user key is detected;

outputting said internal horizontal sync signal and said internal vertical sync signal to a horizontal and vertical deflection circuit;

reading the stored DPMS state from said memory of said microcomputer, after adjusting said DPMS output port to the normal DPMS mode;

generating said OSD drive signal for operating said OSD IC to output an OSD video signal comprising said message; and removing said OSD drive signal from said OSD drive output port after said predetermined time has elapsed.

* * * * *